(12) United States Patent
Kim et al.

(10) Patent No.: US 8,877,371 B2
(45) Date of Patent: Nov. 4, 2014

(54) RECHARGEABLE BATTERY

(75) Inventors: Yong-Sam Kim, Yongin-si (KR); Jang-Hyun Song, Yongin-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 286 days.

(21) Appl. No.: 13/239,737

(22) Filed: Sep. 22, 2011

(65) Prior Publication Data

US 2012/0308879 A1 Dec. 6, 2012

(30) Foreign Application Priority Data

Jun. 2, 2011 (KR) .................. 10-2011-0053383

(51) Int. Cl.
| | |
|---|---|
| *H01M 2/02* | (2006.01) |
| *H01M 10/00* | (2006.01) |
| *H01M 2/22* | (2006.01) |
| *H01M 10/04* | (2006.01) |
| *H01M 2/34* | (2006.01) |

(52) U.S. Cl.
CPC ............ *H01M 2/22* (2013.01); *H01M 10/0436* (2013.01); *Y02E 60/12* (2013.01); *H01M 2/34* (2013.01); *H01M 2/0207* (2013.01)
USPC ....................................... 429/186

(58) Field of Classification Search
None
See application file for complete search history.

(56) References Cited

U.S. PATENT DOCUMENTS

| | | | |
|---|---|---|---|
| 2006/0051667 A1 | 3/2006 | Kim | |
| 2010/0143789 A1 | 6/2010 | Kim | |
| 2011/0039152 A1* | 2/2011 | Kim et al. | ...................... 429/178 |
| 2011/0104528 A1* | 5/2011 | Byun et al. | ...................... 429/61 |

FOREIGN PATENT DOCUMENTS

| | | | |
|---|---|---|---|
| JP | 2008-041264 A | | 2/2008 |
| JP | 2008041264 A | * | 2/2008 |
| KR | 10-2006-0004441 A | | 1/2006 |
| KR | 10 2006-0011315 A | | 2/2006 |
| KR | 10-2006-0092445 A | | 8/2006 |
| KR | 10 2010-0064668 A | | 6/2010 |
| KR | 10 2011-0047610 A | | 5/2011 |

OTHER PUBLICATIONS

Korean Office Action in KR 10-2011-0053383, dated Sep. 18, 2012 (Kim, et al.).
Korean Notice of Allowance in KR 10-2011-0053383, dated Mar. 11, 2013 (KIM, et al.).

* cited by examiner

*Primary Examiner* — Ula C Ruddock
*Assistant Examiner* — Daniel Gatewood
(74) *Attorney, Agent, or Firm* — Lee & Morse, P.C.

(57) ABSTRACT

A rechargeable battery including an electrode assembly including a first electrode and a second electrode; a metal support plate electrically connected to the first electrode, the metal support plate being disposed on at least one side of the electrode assembly; and a case electrically connected to the second electrode and electrically insulated from the metal support plate, the case accommodating the electrode assembly and the metal support plate, wherein the metal support plate includes a protrusion protruding toward an inner side of the case.

14 Claims, 10 Drawing Sheets

RECHARGEABLE BATTERY

BACKGROUND

1. Field

Embodiments relate to a rechargeable battery.

2. Description of the Related Art

A rechargeable battery may be repetitively charged and discharged, unlike a primary battery. A small-capacity rechargeable battery may be used to a portable compact electronic device, e.g., a mobile phone, a laptop computer, and/or a camcorder. A large-capacity rechargeable battery may be used as a motor driving power supply of a hybrid vehicle or an electric vehicle or a large-capacity power storing device.

For example, a quadrangular or prismatic rechargeable battery may include an electrode assembly (including a positive electrode and a negative electrode at sides of a separator), a case accommodating the electrode assembly, a cap plate sealing the case, and electrode terminals on the cap plate and connected to the electrode assembly.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly including a first electrode and a second electrode; a metal support plate electrically connected to the first electrode, the metal support plate being disposed on at least one side of the electrode assembly; and a case electrically connected to the second electrode and electrically insulated from the metal support plate, the case accommodating the electrode assembly and the metal support plate, wherein the metal support plate includes a protrusion protruding toward an inner side of the case.

The metal support plate may include a plane portion facing the at least one side of the electrode assembly, and a connection portion bent along the electrode assembly at one side of the plane portion, the connection portion being connected to an uncoated region of the first electrode.

The protrusion may be on a side of the plane portion or the connection portion.

The protrusion may include a first protrusion, the first protrusion being bent along an end of the uncoated region at the connection portion and being bent again toward the case from the end of the uncoated region.

The protrusion may include a second protrusion, the second protrusion being bent along the electrode assembly at the plane portion on a side opposite to the connection portion and being bent again toward the case from an end of the electrode assembly.

The rechargeable battery may further include a cap plate coupled with the case, wherein the protrusion includes a third protrusion, the third protrusion being bent along an upper portion of the electrode assembly above the plane portion and being bent again toward the cap plate from the upper portion.

The rechargeable battery may further include a first insulation member between the electrode assembly and the metal support plate; and a second insulation member between the metal support plate and the case.

The metal support plate may include a first plane portion and a second plane portion facing respective sides of the electrode assembly and a connection portion bent along the electrode assembly, the connection portion being integrally formed with the first and second plane portions at sides thereof and being connected to an uncoated region of the first electrode and enclosing the uncoated region of the first electrode therewithin.

The protrusion may include a first protrusion, the first protrusion extending from the connection portion and being bent toward the case away from an end of the uncoated portion.

The protrusion may include a pair of second protrusions, the second protrusions being bent along the electrode assembly at sides of the first plane portion and the second plane portion opposite to the connection portion and being bent again toward the case from an end of the electrode assembly to face each other.

The rechargeable battery may further include a cap plate coupled with the case, wherein the protrusion includes a pair of third protrusions, the third protrusions being bent along an upper portion of the electrode assembly above the first plane portion and the second plane portion and being bent again toward the cap plate from the upper portion to face each other.

The metal support plate may include a first metal support plate and a second metal support plate, the first and second metal support plates facing respective sides of the electrode assembly, and the protrusion may include a pair of protrusions, the pair of protrusions facing each other at the first metal support plate and the second metal support plate.

The first metal support plate and the second metal support plate may each include a plane portion facing the at least one side of the electrode assembly, and a connection portion bent along the electrode assembly at one side of the plane portion to face another connection portion and connected to an uncoated region of the first electrode.

The protrusion may include a pair of first protrusions, the first protrusions being bent along an end of the uncoated region at the connection portion and being bent again toward the case from the end of the uncoated region to face each other.

The metal support plate may include a plane portion facing at least one side of the electrode assembly, and a connection portion at one side of the plane portion, the connection portion being connected to an uncoated region of the first electrode, and the protrusion may be on a side of the plane portion or the connection portion, the protrusion having an unevenness or a sawtooth pattern at an end thereof.

BRIEF DESCRIPTION OF THE DRAWINGS

The embodiments will become apparent to those of ordinary skill in the art by describing in detail exemplary embodiments with reference to the attached drawings, in which.

DETAILED DESCRIPTION

Figure 1:
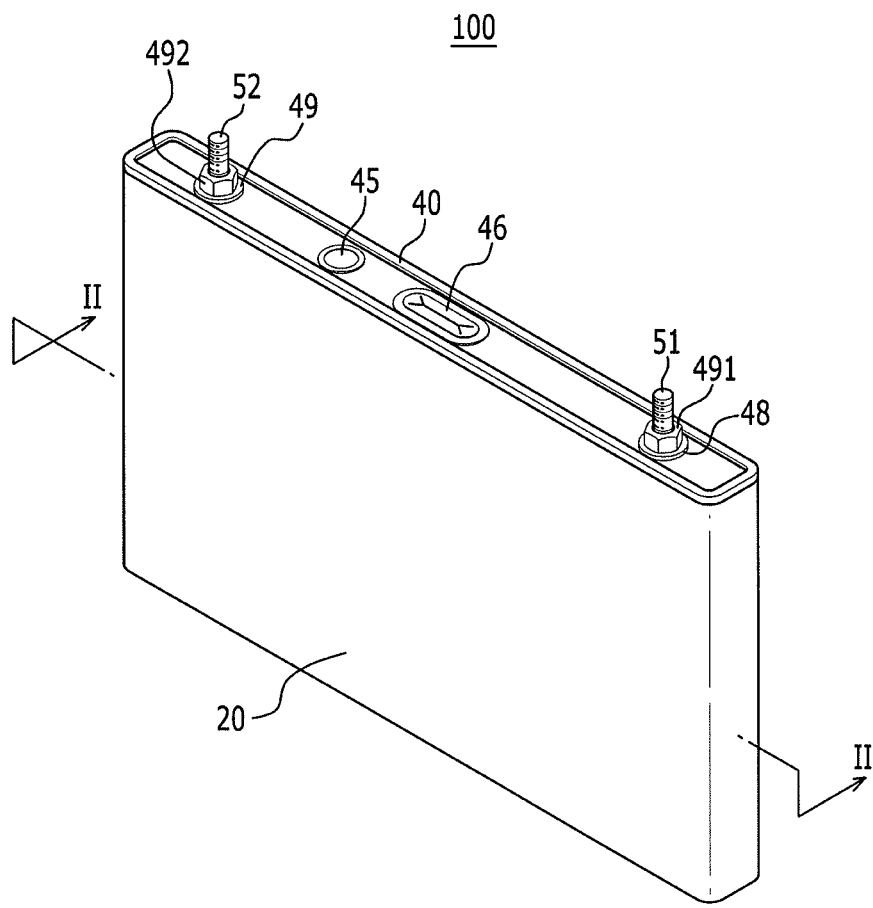
FIG. 1 illustrates a perspective view of a rechargeable battery according to an embodiment.

Korean Patent Application No. 10-2011-0053383, filed on Jun. 2, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
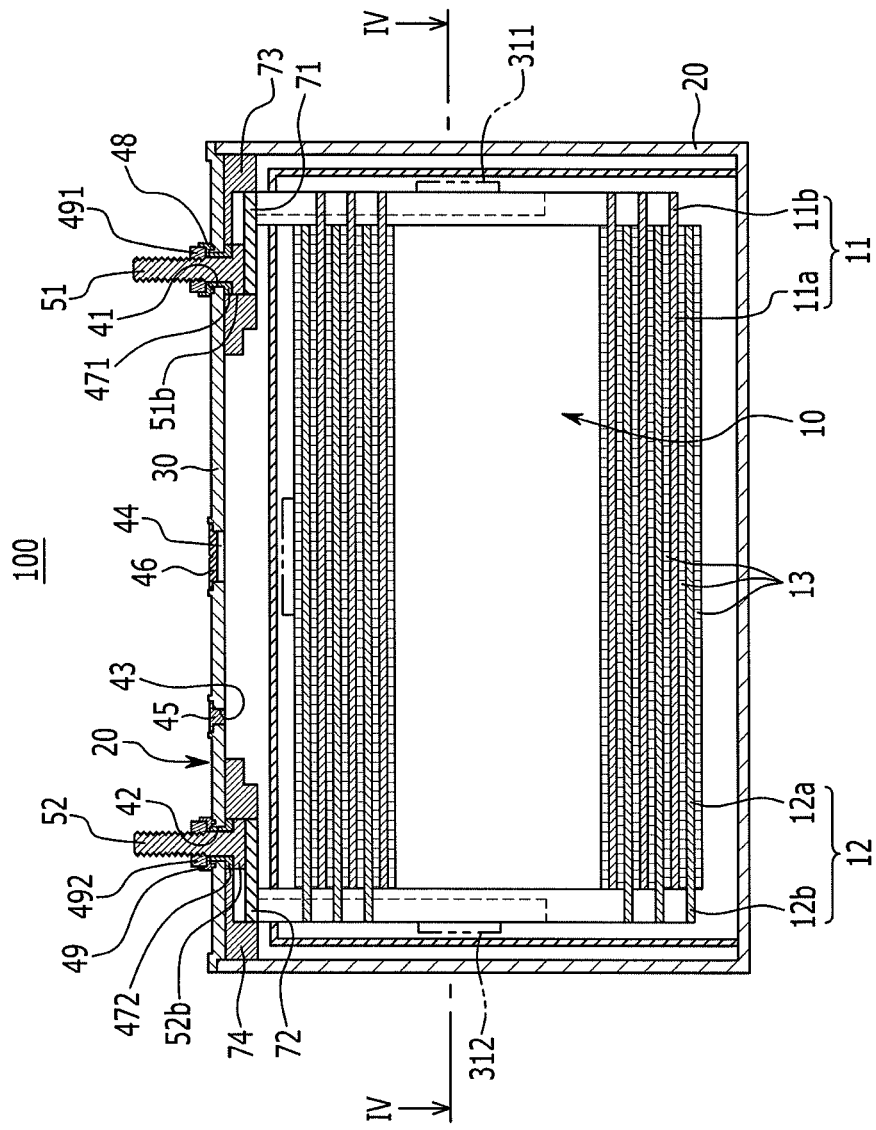
FIG. 2 illustrates a cross-sectional view taken along line II-II of FIG. 1.
Figure 3:
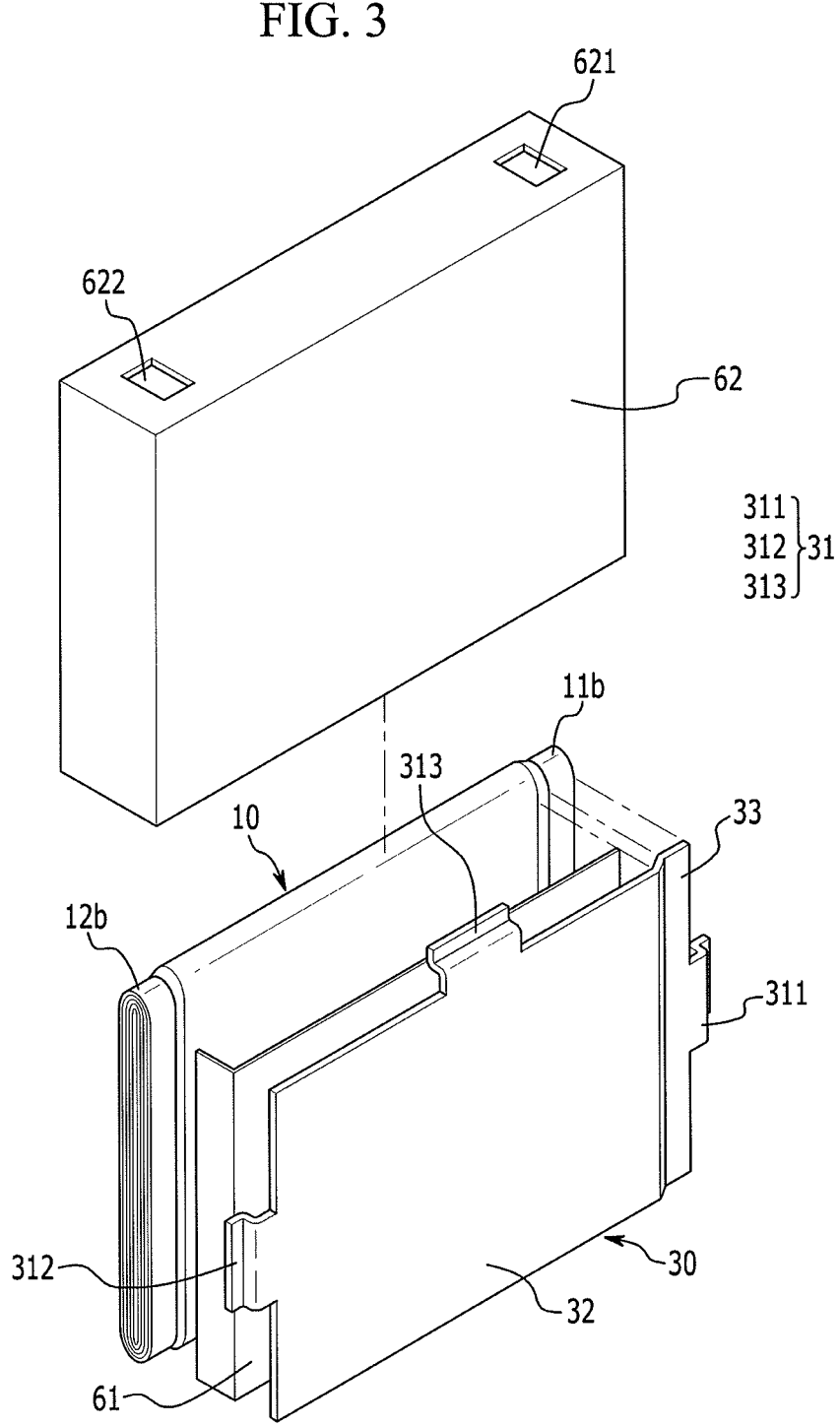
FIG. 3 illustrates an exploded perspective view of an electrode assembly, a first insulation member, a metal support plate, and a second insulation member of the rechargeable battery of FIG. 1.

FIG. 1 illustrates a perspective view of a rechargeable battery 100 according to an embodiment. FIG. 2 illustrates a cross-sectional view taken along line II-II of FIG. 1. FIG. 3 illustrates an exploded perspective view of an electrode assembly 10, a first insulation member 61, a metal support plate 30, and a second insulation member 62 of the rechargeable battery of FIG. 1.

Referring to FIGS. 1 to 3, the rechargeable battery 100 of the present embodiment may include an electrode assembly 10 (for performing a charging and discharging functions), a case 20 (housing or accommodating the electrode assembly 10), and a metal support plate 30 between the electrode assembly 10 and the case 20. In an implementation, an insulation structure may be formed or included.

The rechargeable battery 100 of the present embodiment may have a square or prismatic shape, and may be a lithium ion rechargeable battery. However, the embodiments are not limited to a prismatic rechargeable battery 100; and may be applied to various shapes of rechargeable batteries, e.g., a lithium polymer battery or a cylindrical battery.

In the present embodiment, the electrode assembly 10 may include a first electrode (hereinafter, referred to as a "negative electrode") 11 and a second electrode (hereinafter, referred to as a "positive electrode") 12 on surfaces of an insulating separator 13. The electrode assembly 10 may be formed by laminating and winding the negative electrode 11, the separator 13, and the positive electrode 12. The electrode assembly 10 may include a finishing tape (not shown) at an outside thereof so as to be maintained in the winding form.

The negative electrode 11 and the positive electrode 12 may each be formed by coating a current collector (e.g., a metal thin film) with an active material. Thus, the negative electrode 11 and the positive electrode 12 may respectively include coated regions 11a and 12a (with the active material) and uncoated regions 11b and 12b (without the active material and with an exposed current collector). For example, the negative electrode 11 may include a current collector formed of a copper thin film; and the positive electrode 12 may include a current collector formed of an aluminum thin film.

The uncoated region 11b of the negative electrode 11 may be at one end of the negative electrode 11 along the wound negative electrode 11. The uncoated region 12b of the positive electrode 12 may be at one end of the positive electrode 12 along the wound positive electrode 12. Thus, the uncoated regions 11b and 12b may be disposed at both sides of the electrode assembly 10 to form both ends thereof.

In an implementation, the electrode assembly 10 may be formed by laminating the positive electrode 12 and the negative electrode 11 formed in a single plate with the separator 13 interposed therebetween; or folding and laminating the positive electrode 12, the separator 13, and the negative electrode 11 in a zigzag form (not shown).

The case 20 may have an opening at one side thereof and may have a rectangular parallelepiped shape to accommodate the electrode assembly 10 and set a space for receiving the electrode assembly 10 and an electrolyte.

The metal support plate 30 may be interposed between the electrode assembly 10 and the case 20 so as to cause a short outside of the electrode assembly 10, e.g., before the electrode assembly 10 is deformed and internally short circuited. In the present embodiment, the metal support plate 30 may be electrically connected to the negative electrode 11 to have a negative polarity. However, the embodiments are not limited thereto; and the metal support plate may be connected to the positive electrode (not shown).

For example, when an external force is applied to the rechargeable battery 100, the case 20 may be deformed and thus the electrode assembly 10 may be deformed. In this case, the metal support plate 30 may cause a short at the outside of the electrode assembly 10 before an internal short occurs in the electrode assembly 10, such that voltage charged in the electrode assembly 10 may be rapidly reduced at the outside of the electrode assembly 10. The rapid discharge outside of the electrode assembly 10 may help reduce the likelihood of or prevent ignition or explosion of the rechargeable battery 100.

Prior to providing a detailed description of the metal support plate 30, a cap plate 40 and first and second terminals 51 and 52 will first be described. The rechargeable battery 100 may include the cap plate 40 coupled with the case 20 and the first terminal (hereinafter, referred to as a "negative terminal") 51 and the second terminal (hereinafter, referred to as a "positive terminal") 52 at first and second terminal holes 41 and 42 of the cap plate 40.

The case 20 may be electrically connected to the positive terminal 52 to have a positive polarity. For example, in the rechargeable battery 100, the metal support plate 30 (disposed in the case 20) may be electrically connected to the negative electrode 11; and the case 20 (disposed at the outside) may be electrically connected to the positive electrode 12. Accordingly, when the case 20 and the metal support plate 30 are deformed outside of the electrode assembly 10, the case 20 and the metal support plate 30 may contact one another and thus may induce a short circuit therebetween. In another implementation, the metal support plate 30 may be connected to the positive electrode 12; and the case 20 may be connected to the negative electrode 11 (not shown).

The cap plate 40 may be made of aluminum and may be disposed in the opening to seal the case 20. The cap plate 40 may include an electrolyte inlet 43 and a vent hole 44. The electrolyte inlet 43 may facilitate injection of the electrolyte into the case 20 after bonding the case 20 with the cape plate 40. After injecting the electrolyte, the electrolyte inlet 43 may be sealed by a sealing cap 45. The vent hole 44 may open in response to a predetermined internal pressure in order to discharge the internal pressure of the rechargeable battery 100. The vent hole 44 may be sealed by a vent plate 46. For example, when the internal pressure of the rechargeable battery 100 reaches or exceeds the predetermined pressure, the vent plate 46 may be cut or burst to open the vent hole 44.

The negative terminal 51 and the positive terminal 52 may be respectively disposed at the first and the second terminal holes 41 and 42, e.g., passing through the cap plate 40 to be electrically connected to the negative electrode 11 and the positive electrode 12 of the electrode assembly 10. For example, the electrode assembly 10 may be drawn outside the case 20 or connected to an external load or device through the negative terminal 51 and the positive terminal 52.

In an implementation, the case 20 may be electrically connected to the uncoated region 12b of the positive electrode 12 in the electrode assembly 10. In this case, the positive terminal 52 and the second terminal hole 42 may form an electric connection structure. Accordingly, the positive electrode 12 of the electrode assembly 10, the positive terminal 52, the cap plate 40 of the second terminal hole 42, and the case 20 may have the same positive polarity.

For example, the positive terminal 52 may include a conductive member 49 disposed at the second terminal hole 42 to be electrically connected to the cap plate 40. The conductive member 49 may be disposed above the second terminal hole 42 between the positive terminal 52 and an inner surface of the second terminal hole 42 to electrically connect the positive terminal 52 and the second terminal hole 42 or the cap plate 40. In addition, the conductive member 49 may further extend between a nut 492 (which is screw-fastened to the positive terminal 52) and the cap plate 40 from the outside of the cap plate 40 to further electrically connect the nut 492 (and the positive terminal 52) with the cap plate 40.

The metal support plate 30 (electrically insulated from the case 20) may be electrically connected to the negative terminal 51 through the uncoated region 11b of the negative electrode 11. In this case, the negative terminal 51 and the first terminal hole 41 may form an electric insulation structure.

For example, the negative terminal 51 may include an insulator 48 disposed at the first terminal hole 41 to be electrically insulated from the cap plate 40. The insulator 48 may be disposed above the first terminal hole 41 (between the negative terminal 51 and the first terminal hole 41) to seal and insulate the negative terminal 51 and the first terminal hole 41. In addition, the insulator 48 may further extend between a nut 491 (which is screw-fastened to the negative terminal 51) and the cap plate 40 from the outside of the cap plate 40 to electrically insulate the nut 491 and the cap plate 40.

Further, the negative terminal 51 and the positive terminal 52 may include flanges 51b and 52b disposed at the inside of the case 20, respectively. Gaskets 471 and 471 may be respectively interposed between the negative and positive terminals 51 and 52 and the first and the inner surfaces of the second terminal holes 41 and 42. The gaskets 471 and 472 may seal lower portions of the first and the second terminal holes 41 and 42 so as to prevent the electrolyte from leaking through the first and the second terminal holes 41 and 42. In addition, the gaskets 471 and 472 may further extend between the flanges 51b and 52b and the cap plate 40 so as to seal between the flanges 51b and 52b and the cap plate 40.

The negative and positive terminals 51 and 52 (each being electrically connected to the electrode assembly 10 by first and second lead tabs 71 and 72 and first and second lead tabs 71 and 72) may be electrically insulated from the cap plate 40 by first and second electrode insulation members 73 and 74.

For example, the first electrode lead tab (hereinafter, referred to as a "negative electrode lead tab") 71 may be connected to the negative terminal 51 at one side thereof and connected to the uncoated region 11b of the negative electrode 11 in the electrode assembly 10 at another side thereof. One side of the negative electrode lead tab 71 may be welded to the flange 51b of the negative terminal 51; and another side may be welded to the uncoated region 11b of the negative electrode 11 to form a conductive structure.

The second electrode lead tab (hereinafter, referred to as a "positive electrode lead tab") 72 may be connected to the positive terminal 52 at one side thereof and connected to the uncoated region 12b of the positive electrode 12 in the electrode assembly 10 at another side thereof. One side of the positive electrode lead tab 72 may be welded to the flange 52b of the positive terminal 52; and another side may be welded to the uncoated region 12b of the positive electrode 12 to form a conductive structure.

The first electrode insulation member (hereinafter, referred to as a "negative electrode insulation member") 73 may be disposed between the negative electrode lead tab 71 and the cap plate 40 to electrically insulate the negative electrode lead tab 71 from the cap plate 40. The second electrode insulation member (hereinafter, referred to as a "positive electrode insulation member") 74 may be disposed between the positive electrode lead tab 72 and the cap plate 40 to electrically insulate the positive electrode lead tab 72 from the cap plate 40.

Figure 4:
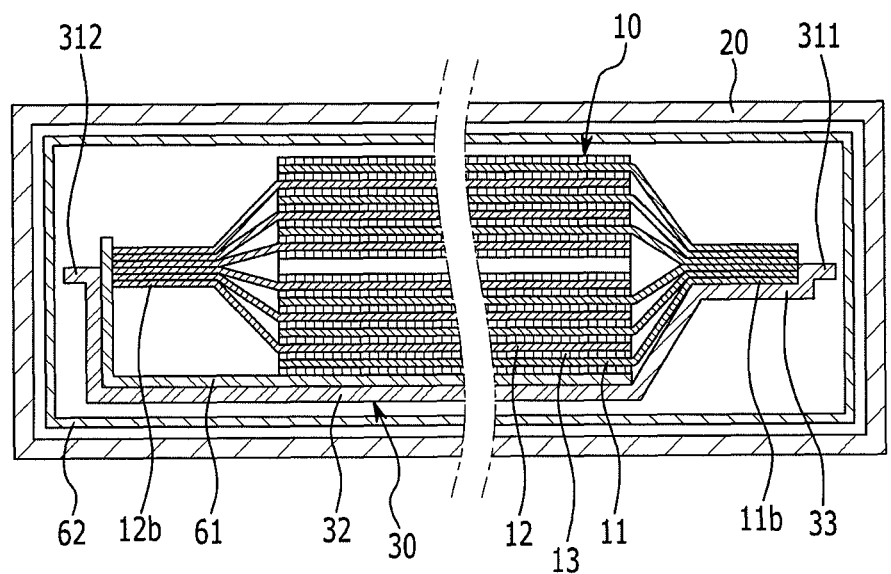
FIG. 4 illustrates a cross-sectional view taken along line IV-IV of FIG. 2.

FIG. 4 illustrates a cross-sectional view taken along line IV-IV of FIG. 2. Referring to FIGS. 3 and 4, the metal support plate 30 may be disposed at one surface of a wide front surface and a rear surface of the electrode assembly 10 (with a first insulation member 61 interposed between the electrode assembly 10 and the metal support plate 30 and a second insulation member 62 interposed between the case 20 and the metal support plate). The metal support plate 30 may be disposed at one surface of the electrode assembly 10.

The first insulation member 61 may electrically insulate the metal support plate 30 from a side of the electrode assembly 10 and may be formed from an insulation sheet attached on an inner side of the metal support plate 30 or a coated layer coated on the inner side of the metal support plate 30.

The second insulation member 62 may electrically insulate the metal support plate 30 from the case 20 and may be formed from an insulation sheet attached on an inner side of the case 20 or an outer side of the metal support plate 30 or a coated layer coated on the inner side of the case 20 or the outer side of the metal support plate 30.

A protrusion 31 may be provided on at least one side of the metal support plate 30 and may extend toward the second insulation member 62 and the inner side of the case 20. When the case is deformed by an external impact, the second insulation member 62 and the case 20 may be pushed or pressed toward the electrode assembly 10. In this case, the protrusion 31 may perforate the pressed second insulation member 62 and may contact the case 20 (e.g., outside of the electrode assembly 10) so as to induce a short circuit between metal support plate 30 and the case 20. In addition, if a conductive impurity contacts the metal support plate 30 through the case 20 and the second insulation member 62, the metal support plate 30 may be short-circuited with the case 20 through the conductive impurity.

For example, the metal support plate 30 may include a plane portion 32 and a connection portion 33. The plane portion 32 may have a planar shape and may face one of front surface and the rear surface of the electrode assembly 10 to efficiently induce the short through the overall area of the electrode assembly 10 in the event of penetration by the conductive impurity. The connection portion 33 may be a portion electrically connected to the electrode assembly 10 and may be bent along the electrode assembly 10 at one side of the plane portion 32 to be welded to the uncoated region 11b of the negative electrode 11. When the negative electrode 11 is formed of a copper thin film current collector, the metal support plate 30 may be made of copper. When the negative electrode 11 is an aluminum thin film, the metal support plate 30 may be made of aluminum. When the metal support plate 30 is made of the same material as the negative electrode 11 or the positive electrode 12, welding properties of the connection portion 33 and the uncoated region may be improved.

The protrusion 31 (for inducing the short) may be formed on the plane portion 32 and/or on the connection portion 33. Referring to FIG. 3, the protrusion 31 may include first, second, and third protrusions 311, 312, and 313, and may help ensure safety even if an external impact is applied in various directions (such as both sides and/or an upper side of the rechargeable battery 100).

The first protrusion 311 may be bent along an end of the uncoated region 11b at the connection portion 33 and may be bent again toward the case 20 at an end of the uncoated region 11b of the negative electrode 11 so as to induce the short at the connection portion 33 if the case 20 is deformed.

The second protrusion 312 may be bent along an end of the electrode assembly 10 at the plane portion 32 (opposite to the connection portion 33) and may be bent again toward the case 20 at an end of the uncoated region 12b of the positive electrode 12 so as to induce the short at a side of the metal support plate 30 opposite to the connection portion 33 if the case 20 is deformed. As shown in FIG. 4, the second protrusion 312 may be spaced apart from the uncoated region 12b of the positive electrode 12.

When included, the third protrusion 313 may be bent along an upper portion of the electrode assembly 10 (above or at a top of the plane portion 32) and may be bent again toward the cap plate 40 at the upper portion of the electrode assembly 10 (see FIG. 1) so as to induce the short at the cap plate 40 if the case 20 is deformed.

When the third protrusion 313 is included, the second insulation member 62 may have a structure with a closed upper portion so as to insulate between the upper portion of the metal support plate 30 and the cap plate 40. Accordingly, the second insulation member 62 may include outlets 621 and 622 drawing out the negative and positive electrode lead tabs 71 and 72 at the upper portion thereof.

Hereinafter, other embodiments will be described, and a repeated description for like configuration is omitted and different configurations will be comparatively described, as compared with the previous embodiments.

Figure 5:
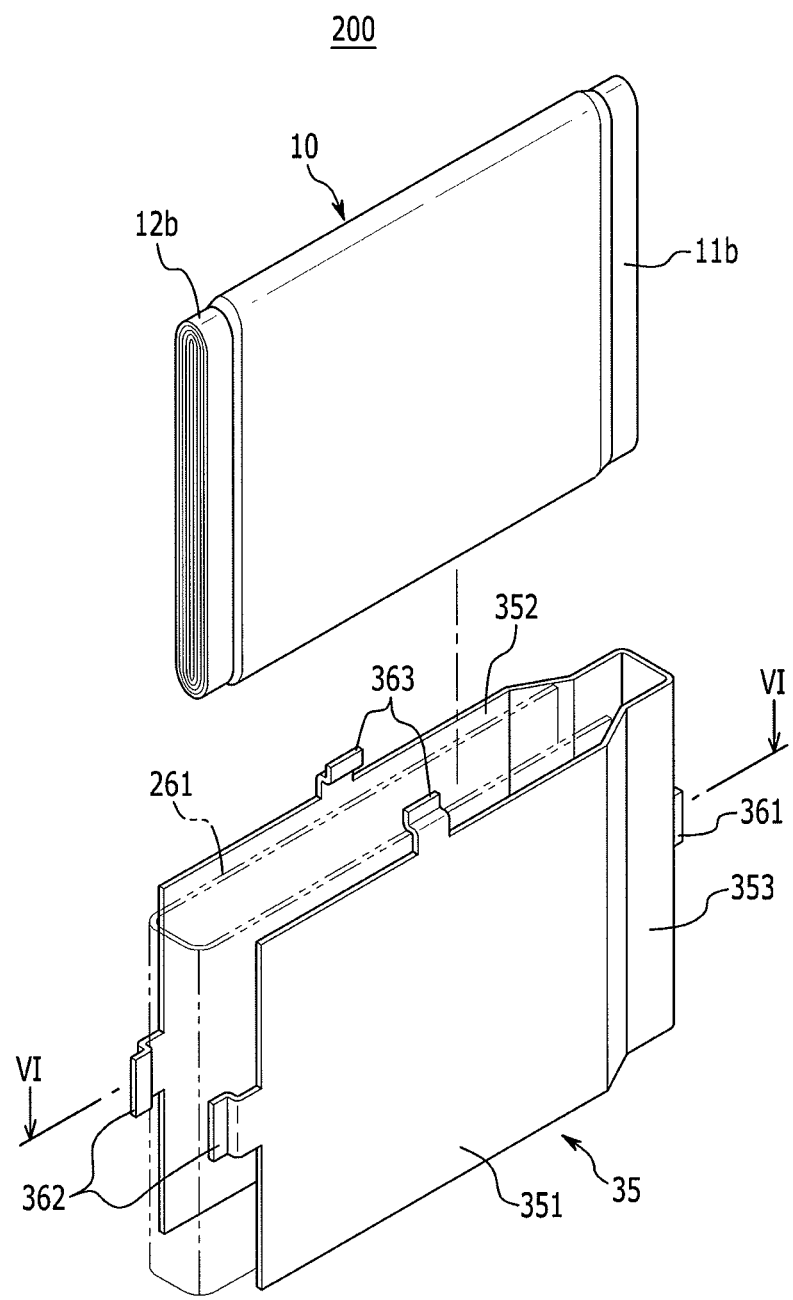
FIG. 5 illustrates an exploded perspective view of an electrode assembly and a metal support plate in a rechargeable battery according to another embodiment.
Figure 6:
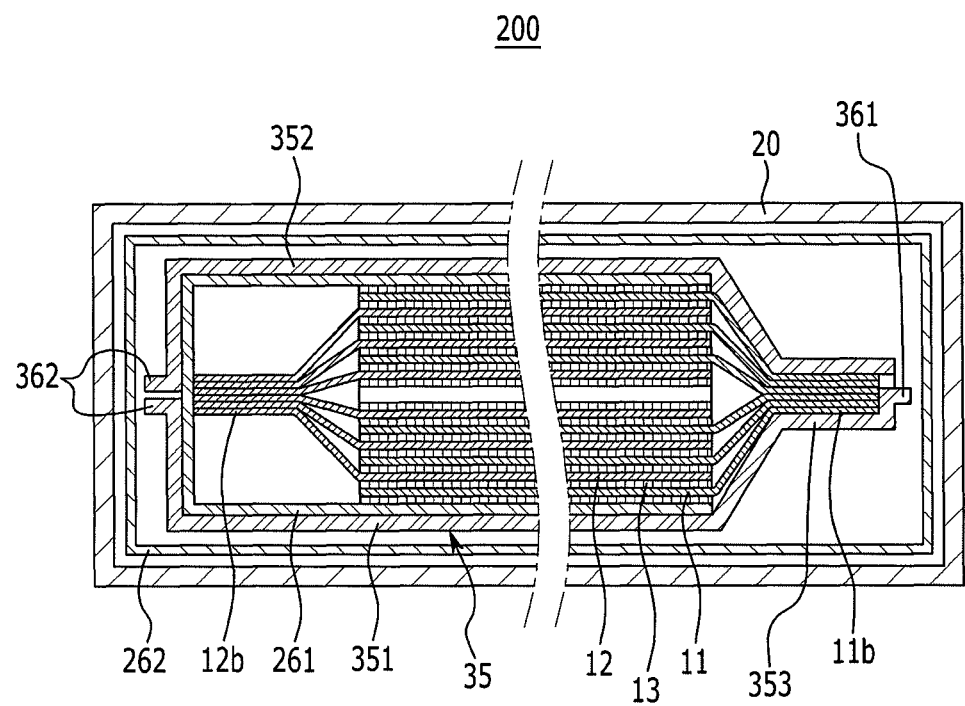
FIG. 6 illustrates a cross-sectional view taken along line VI-VI of FIG. 5.

FIG. 5 illustrates an exploded perspective view of an electrode assembly 10 and a metal support plate 35 in a rechargeable battery 200 according to another embodiment. FIG. 6 illustrates a cross-sectional view taken along line VI-VI of FIG. 5.

Referring to FIGS. 5 and 6, the metal support plate 35 may include first and second plane portions 351 and 352 (on respective sides of the electrode assembly 10) and a connection portion 353. The connection portion 353 may be bent along an end of the electrode assembly 10 and may be integrally formed and disposed at one side of the respective first and the second plane portions 351 and 352. The connection portion 353 may be welded to an uncoated region 11b of the negative electrode 11 such that the uncoated region 11b is surrounded or covered by the connection portion 353.

In this case, a first insulation member 261 may have a structure surrounding regions (except for the uncoated region 11b of the negative electrode 11) in the electrode assembly 10. A second insulation member 262 may be interposed between the metal support plate 35 and the case 20 to electrically insulate therebetween.

A first protrusion 361 may be cut or extend at the connection portion 353 and may be bent toward the case 20 from an end of the uncoated region 11b of the negative electrode 11 to induce the short at the connection portion 353 if the case 20 is deformed.

A second protrusion 362 (e.g., a pair of second protrusions 362) may be bent along the electrode assembly 10 at the first and the second plane portions 351 and 352 (opposite to the connection portion 353) to face each other and may be bent again toward the case 20 from the end of the electrode assembly 10 to induce the short at the metal support plate (opposite to the connection portion 353) if the case 20 is deformed. As shown in FIG. 6, the second protrusion 362 may be spaced apart from the uncoated region 12b of the positive electrode 12 (e.g., by the first insulation member 261).

When included, a third protrusion 363 (e.g., a pair of third protrusions 363) may be bent along the upper portion of the electrode assembly 10 (above the first and the second plane portions 351 and 352) to face each other and may be bent again toward the cap plate 40 from the upper portion thereof to induce the short at the cap plate 40 if the case 20 and/or the cap plate 40 are deformed.

As noted above, a pair of the second protrusions 362 may be included at the side of the metal support plate 35 (opposite to the connection portion 352); and a pair of the third protrusions 363 may be included adjacent to the cap plate 40. Accordingly, the second and the third protrusions 362 and 363 may efficiently induce the short at respective sides if the case 20 is deformed.

Figure 7:
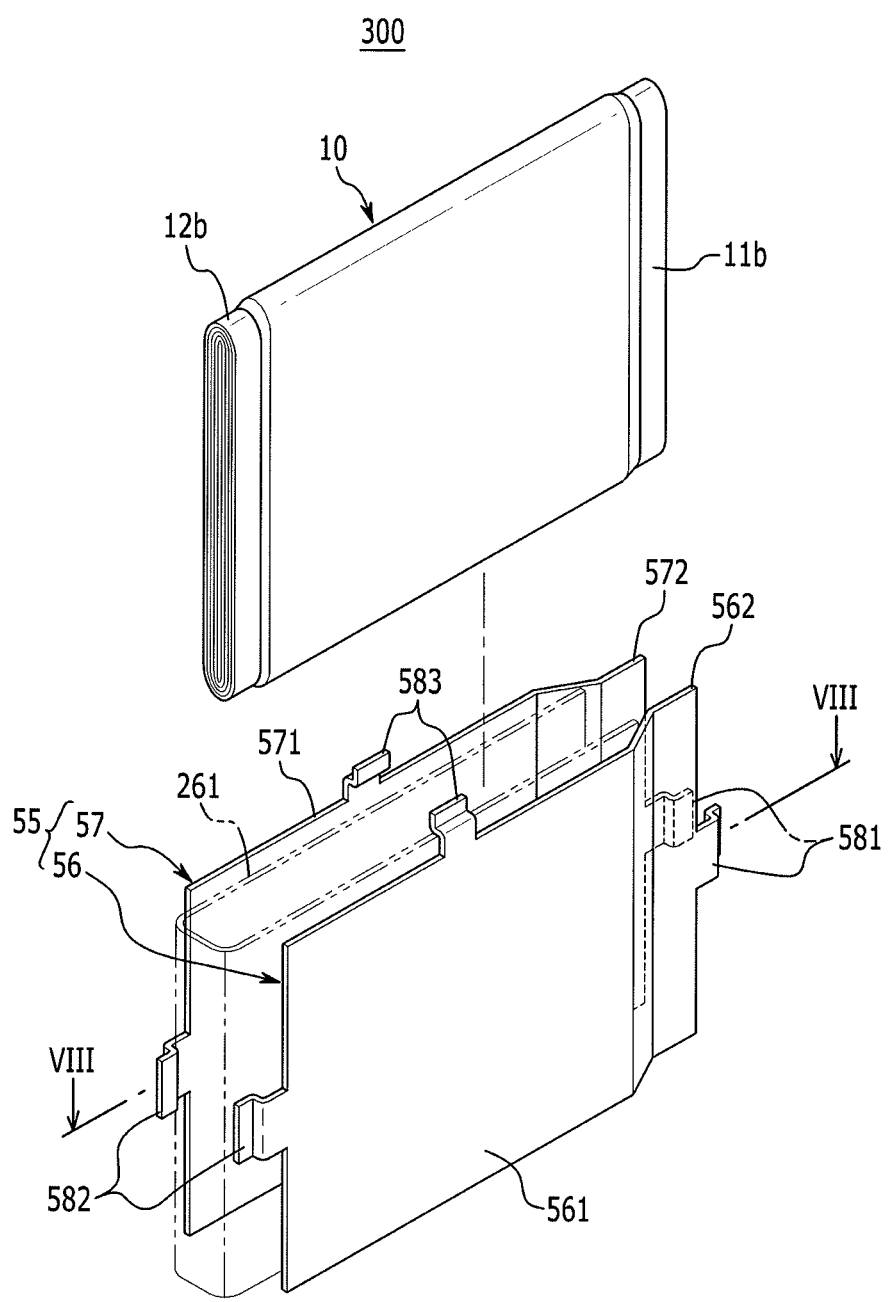
FIG. 7 illustrates an exploded perspective view of an electrode assembly and a metal support plate in a rechargeable battery according to yet another embodiment.
Figure 8:
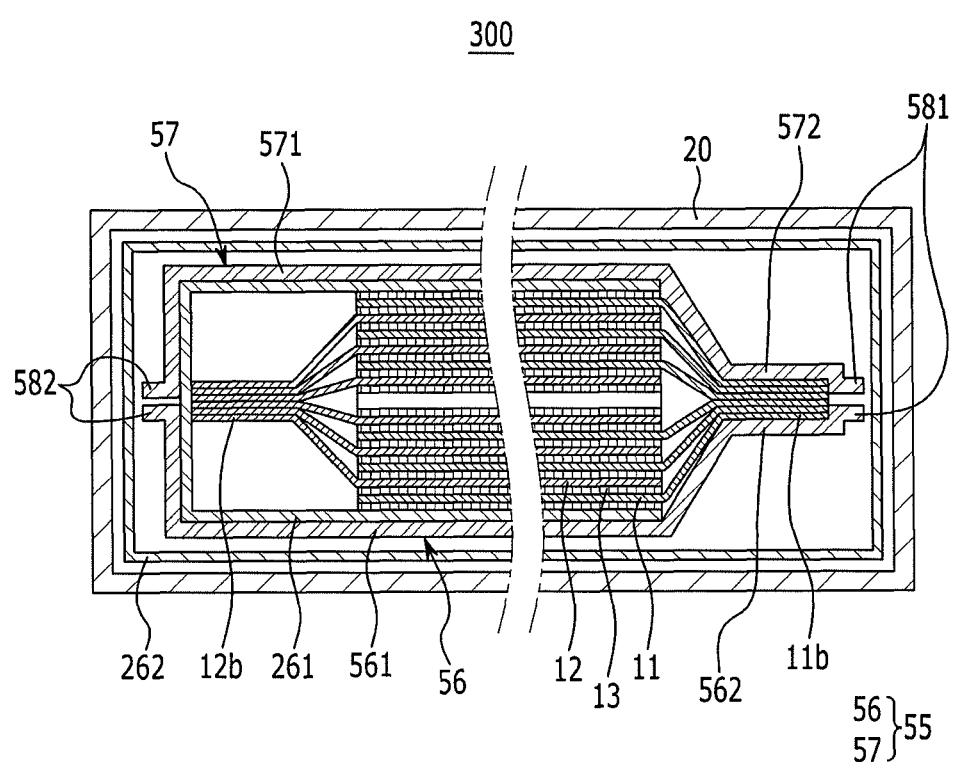
FIG. 8 illustrates a cross-sectional view taken along line VIII-VIII of FIG. 7.

FIG. 7 illustrates an exploded perspective view of an electrode assembly 10 and a metal support plate 37 in a rechargeable battery 300 according to yet another embodiment. FIG. 8 illustrates a cross-sectional view taken along line VIII-VIII of FIG. 7.

In the previous embodiments, one metal support plate 30 may be installed at one side of the electrode assembly 10 or one metal support plate 35 may be installed at both sides of the electrode assembly 10. In comparison, in the present embodiment, two metal support plates 55 may be installed at respective sides of the electrode assembly 10.

Referring to FIGS. 7 and 8, the metal support plate 55 may include first and second metal support plates 56 and 57 facing respective sides of the electrode assembly 10. First, second, and third protrusions 581, 582, and 583 may face each other at sides of the first and the second metal support plates 56 and 57.

The first and the second metal support plates 56 and 57 may each include plane portions 561 and 571 (facing sides of the electrode assembly 10) and connection portions 562 and 572 (connected to the uncoated region 11b of the negative electrode 11). The connection portions 562 and 572 may be bent along the electrode assembly 10 at one side of the plane portions 561 and 571 to face each other and may be welded to the uncoated region 11b.

The first protrusion 581 (e.g., a pair of first protrusions 581) may be bent along an end of the uncoated region 11b of the negative electrode 11 at the connection portions 562 and 572 to face each other and may be bent again toward the case 20 from an end of the uncoated region 11b. Thus, the short may be induced at the connection portions 562 and 572 if the case 20 is deformed.

The second protrusion 582 (e.g., a pair of second protrusions 582) may be bent along the electrode assembly 10 at a side of the plane portions 561 and 571 (opposite to the connection portions 562 and 572) to face each other and may be bent again toward the case 20 from the end of the electrode assembly 10. Thus, the short may be induced at the side opposite to the connection portions 562 and 572 if the case 20 is deformed. As shown in FIG. 8, the second protrusion 582 may be spaced apart from the uncoated region 12b of the positive electrode 12 (e.g., by the first insulation member 261).

The third protrusion 583 (e.g., a pair of third protrusions 583) may be bent along the upper portion of the electrode assembly 10 (above the plane portions 561 and 571) to face each other and may be bent again toward the cap plate 40 from the upper portion thereof. Thus, the short may be induced at the cap plate 40 if the case 20 and/or the cap plate 40 are deformed.

Figure 9:
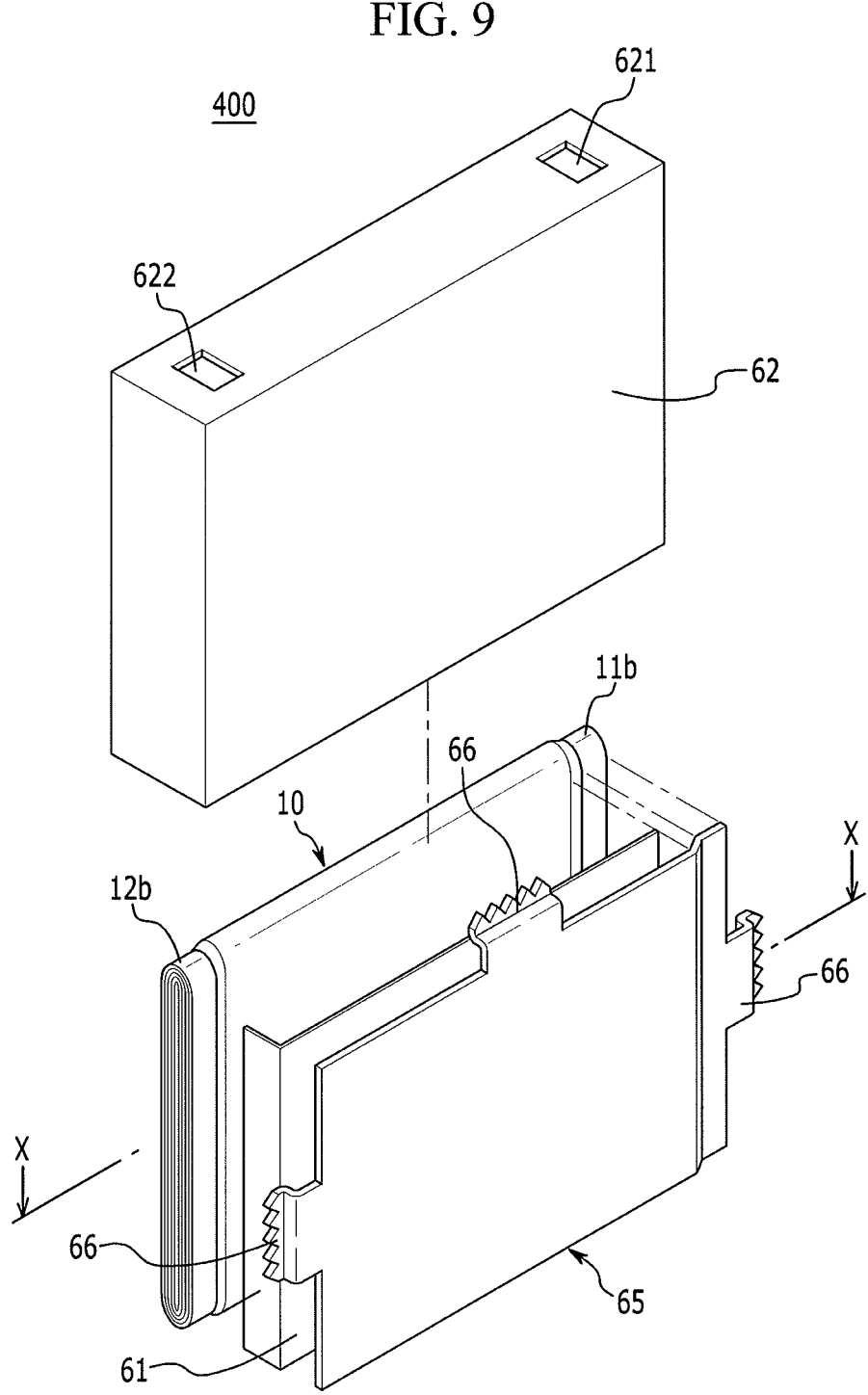
FIG. 9 illustrates an exploded perspective view of an electrode assembly and a metal support plate in a rechargeable battery according to still another embodiment.
Figure 10:
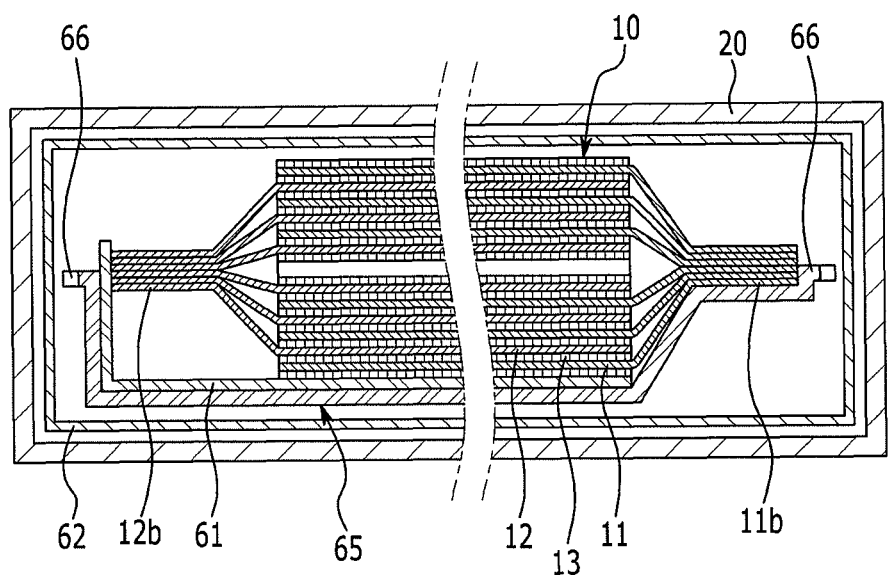
FIG. 10 illustrates a cross-sectional view taken along line X-X of FIG. 9.

FIG. 9 illustrates an exploded perspective view of an electrode assembly 10 and a metal support plate 65 in a rechargeable battery according to still another embodiment. FIG. 10 illustrates a cross-sectional view taken along line X-X of FIG. 9. In contrast to the previous embodiments, the metal support plate 65 of the present embodiment may include a protrusion 66 having an unevenness or a sawtooth pattern at an end thereof. The protrusion 66 having the unevenness or the sawtooth may facilitate boring or penetration of the second insulation member 62 if the case 20 is deformed to facilitate the short circuit with the case 20. Accordingly, the short of the protrusion 66 of the metal support plate 65 and the case 20 may be generated at the outside of the electrode assembly 10 and insulated from a first insulation member 61.

The protrusion 66 of the present embodiment may be applied to all the previous embodiments. The protrusion 31 of the first embodiment may cut the second insulation members 62 and 262 along a line to form a line-contact short structure at the case 20. The protrusion 66 of the present embodiment may perforate the second insulation member 62 with a plurality of dots to form a plural dot-contact short structure at the case 20.

By way of summation and review, if a conductive foreign material (e.g., a nail or an awl) were to penetrate through the case of the rechargeable battery and enter the electrode assembly, a short may occur inside of the electrode assembly due to the conductive foreign material. Further, if the case of the rechargeable battery were to be deformed by an external force, a short may occur inside of the electrode assembly due to the deformation of the case and subsequent deformation of the electrode assembly.

If the short occurs inside of the electrode assembly, a potential difference between the charged positive and negative electrodes may rapidly decrease, heat may be generated, and an electrolyte may be degraded. When the electrolyte is degraded, a gas, e.g., methane, hydrogen, and/or carbon dioxide, may be generated in quantity; and an inner temperature and pressure of the rechargeable battery may be rapidly increased, such that the rechargeable battery may ignite or explode.

Accordingly, the embodiments provide a rechargeable battery that advantageously reduces a voltage of an electrode assembly by generating a short at an outside of the electrode assembly (prior to deformation of the electrode assembly) if a case is deformed by an external force.

The embodiments also provide a rechargeable battery that advantageously reduces a voltage of an electrode assembly by generating a short at the outside of the electrode assembly (prior to a conductive foreign material entering the electrode assembly) if the conductive foreign material penetrates through the case.

According to the embodiments, when the case is deformed by an external force, a short may be induced outside of the electrode assembly before the electrode assembly is deformed. Further, when a conductive foreign material penetrates through the case, the short may be induced outside of the electrode assembly before the conductive foreign material enters the electrode assembly. Therefore, when the case is further deformed and, as a result, the electrode assembly is short-circuited, the voltage of the electrode assembly may already be reduced, such that ignition or explosion of the rechargeable battery may be reduced or prevented. The embodiments provide a rechargeable battery having improved safety with respect to deformation of a case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    an electrode assembly including a first electrode and a second electrode;
    a metal support plate electrically connected to the first electrode, the metal support plate being disposed on at least one side of the electrode assembly;
    a case electrically connected to the second electrode and electrically insulated from the metal support plate, the case accommodating the electrode assembly and the metal support plate; and
    a cap plate coupled with the case;
    wherein the metal support plate includes:
        a plane portion facing the at least one side of the electrode assembly,
        a connection portion bent along the electrode assembly at one side of the plane portion, the connection portion contacting the plane portion and being connected to an uncoated region of the first electrode, and
        a protrusion protruding toward an inner side of the case.

2. The rechargeable battery as claimed in claim 1, wherein the protrusion is on a side of the plane portion or the connection portion.

3. The rechargeable battery as claimed in claim 1, wherein the protrusion includes a first protrusion, the first protrusion being bent along an end of the uncoated region at the connection portion and being bent again toward the case from the end of the uncoated region.

4. The rechargeable battery as claimed in claim 1, wherein the protrusion includes a second protrusion, the second protrusion being bent along the electrode assembly at the plane portion on a side opposite to the connection portion and being bent again toward the case from an end of the electrode assembly.

5. The rechargeable battery as claimed in claim 1,
wherein the protrusion includes a third protrusion, the third protrusion being bent along an upper portion of the electrode assembly above the plane portion and being bent again toward the cap plate from the upper portion.

6. The rechargeable battery as claimed in claim 1, further comprising:
a first insulation member between the electrode assembly and the plane portion; and
a second insulation member between the metal support plate and the case.

7. The rechargeable battery as claimed in claim 1, wherein:
the plane portion includes a first plane portion and a second plane portion facing respective sides of the electrode assembly; and
the connection portion is integrally formed with the first and second plane portions at sides thereof and enclosing the uncoated region of the first electrode therewithin.

8. The rechargeable battery as claimed in claim 7, wherein the protrusion includes a first protrusion, the first protrusion extending from the connection portion and being bent toward the case away from an end of the uncoated region.

9. The rechargeable battery as claimed in claim 7, wherein the protrusion includes a pair of second protrusions, the second protrusions being bent along the electrode assembly at sides of the first plane portion and the second plane portion opposite to the connection portion and being bent again toward the case from an end of the electrode assembly to face each other.

10. The rechargeable battery as claimed in claim 7,
wherein the protrusion includes a pair of third protrusions, the third protrusions being bent along an upper portion of the electrode assembly above the first plane portion and the second plane portion and being bent again toward the cap plate from the upper portion to face each other.

11. The rechargeable battery as claimed in claim 1, wherein:
the metal support plate includes a first metal support plate and a second metal support plate, the first and second metal support plates facing respective sides of the electrode assembly, and
the protrusion includes a pair of protrusions, the pair of protrusions facing each other at the first metal support plate and the second metal support plate.

12. The rechargeable battery as claimed in claim 11, wherein the first metal support plate and the second metal support plate each include:
a plane portion facing the at least one side of the electrode assembly, and
a connection portion bent along the electrode assembly at one side of the plane portion to face another connection portion, the connection portion contacting the plane portion and being connected to an uncoated region of the first electrode.

13. The rechargeable battery as claimed in claim 12, wherein the protrusion includes a pair of first protrusions, the first protrusions being bent along an end of the uncoated region at the connection portion and being bent again toward the case from the end of the uncoated region to face each other.

14. The rechargeable battery as claimed in claim 1, wherein:
the protrusion is on a side of the plane portion or the connection portion, the protrusion having an unevenness or a sawtooth pattern at an end thereof.

* * * * *